United States Patent

Kizawa

[11] Patent Number: 5,979,247
[45] Date of Patent: *Nov. 9, 1999

[54] FLOW SENSOR HAVING A FIXED RESISTANCE AND A VARIABLE RESISTANCE

[75] Inventor: Hidetaka Kizawa, Tokyo, Japan

[73] Assignee: Nihon Kohden Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/956,026

[22] Filed: Oct. 22, 1997

[30] Foreign Application Priority Data

Oct. 22, 1996 [JP] Japan ................................. 8-279270

[51] Int. Cl.⁶ ....................................................... G01F 1/22
[52] U.S. Cl. ....................................................... 73/861.53
[58] Field of Search ........................... 73/861.47, 861.52, 73/861.53, 861.63, 861.64, 861.82, 197

[56] References Cited

U.S. PATENT DOCUMENTS

| | | | |
|---|---|---|---|
| 4,083,245 | 4/1978 | Osborn | 73/207 |
| 5,033,312 | 7/1991 | Stupecky | 73/861.53 |
| 5,038,621 | 8/1991 | Stupecky | 73/861.53 |
| 5,088,332 | 2/1992 | Merilainen et al. | 73/861.65 |
| 5,379,650 | 1/1995 | Kofoed et al. | 73/861.52 |

*Primary Examiner*—Harshad Patel
*Attorney, Agent, or Firm*—Sughrue, Mion, Zinn Pacpeak & Seas, PLLC

[57] ABSTRACT

A flow sensor which is used for measuring the flow rate of a gas is disclosed. The flow sensor comprises a flow tube for allowing a gas to be circulated therethrough, a resistance is arranged so as to go across the inside of the flow tube, and pressure ports arranged on a tubular wall of the flow tube. The resistance includes a fixed resistance and a variable resistance. The fixed resistance is a block being fixed to a circumferential wall of the flow tube and closing part of a flow path of the flow tube. Parallel plates are arranged in the block so as to confront the two pressure ports, respectively, and so as to extend in parallel to the gas flowing direction. The two pressure ports are positioned within areas defined by the parallel plates, respectively. The variable resistance is an orifice membrane having a flap, an outer circumference of the membrane being fixed to an inner circumference of the flow tube, the flap forming an aperture in the middle of the membrane while being displaced in a direction of flow of the gas.

6 Claims, 11 Drawing Sheets

PRIOR ART

FIG. 14

PRIOR ART

FIG. 15

PRIOR ART

FIG. 16

PRIOR ART

FIG. 17

PRIOR ART

FIG. 18

FLOW SENSOR HAVING A FIXED RESISTANCE AND A VARIABLE RESISTANCE

BACKGROUND OF THE INVENTION

1. Field of the Invention

The present invention relates to a flow sensor used for measuring the flow rate of a gas, and more particularly to a flow sensor adapted for measuring the respiratory flow of a living body.

2. Description of Related Art

As instruments for measuring parameters related to the respiration of a patient while connected to an artificial respiration device, an anesthesia device, or the like, various types have heretofore been known. As an apparatus for measuring respiratory flow among these instruments, a differential pressure type flow measuring apparatus is widely used. The differential pressure type flow measuring apparatus measures flow rate based on differential pressure by arranging a resistance within a flow path and by detecting pressure before and past the resistance.

Figure 10:
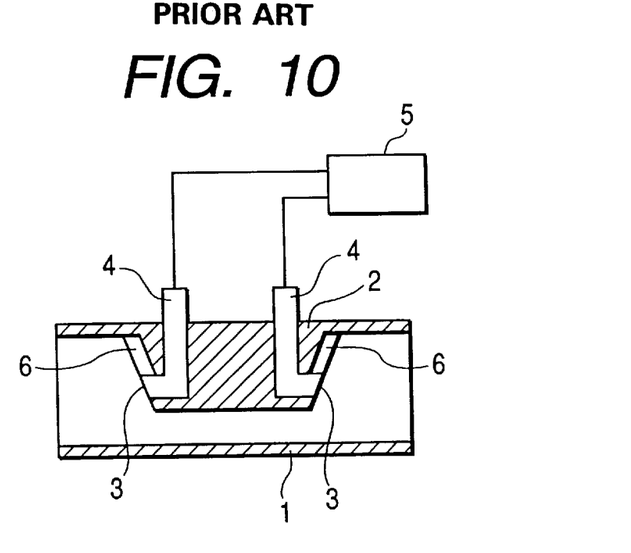
FIG. 10 a longitudinal sectional view showing the construction of a flow sensor having a fixed resistance in an exemplary conventional flow measuring apparatus.
Figure 11:
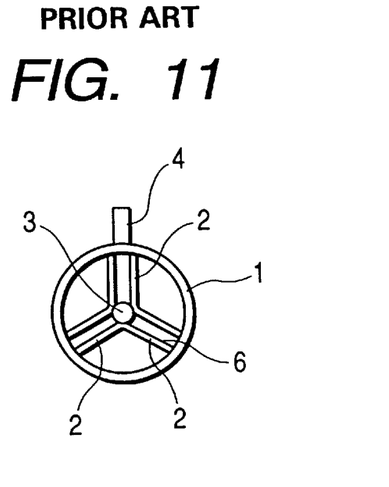
FIG. 11 a side view of FIG. 10.
Figure 12:
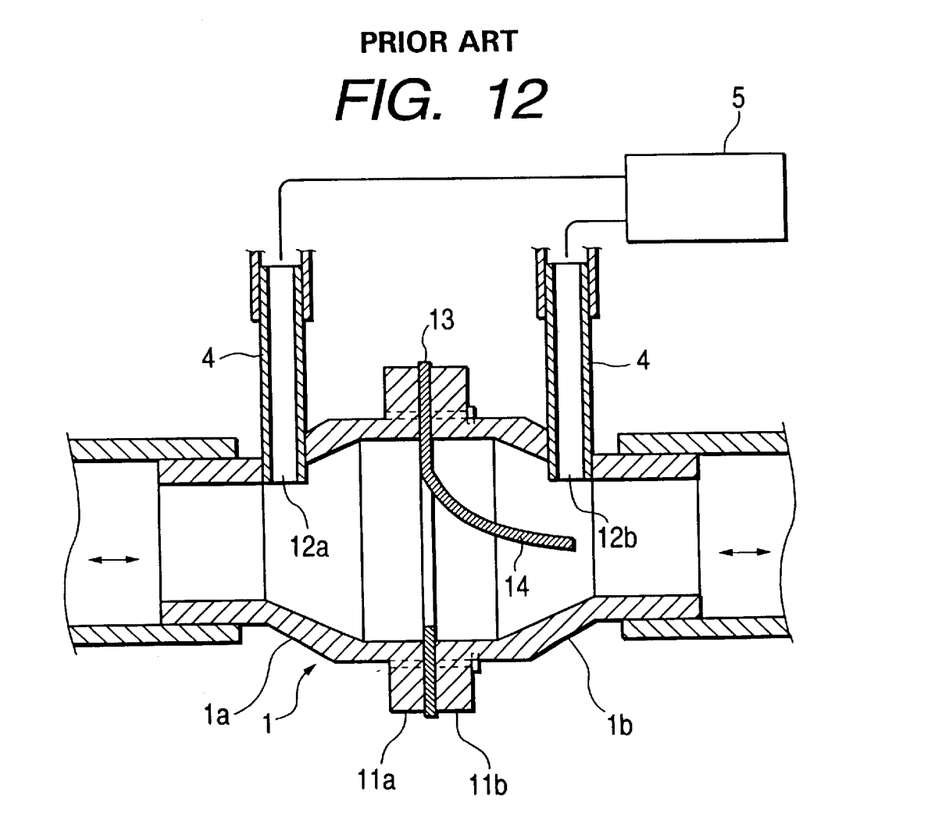
FIG. 12 a longitudinal sectional view showing the construction of a flow sensor having a variable resistance in another exemplary conventional flow measuring apparatus.
Figure 13:
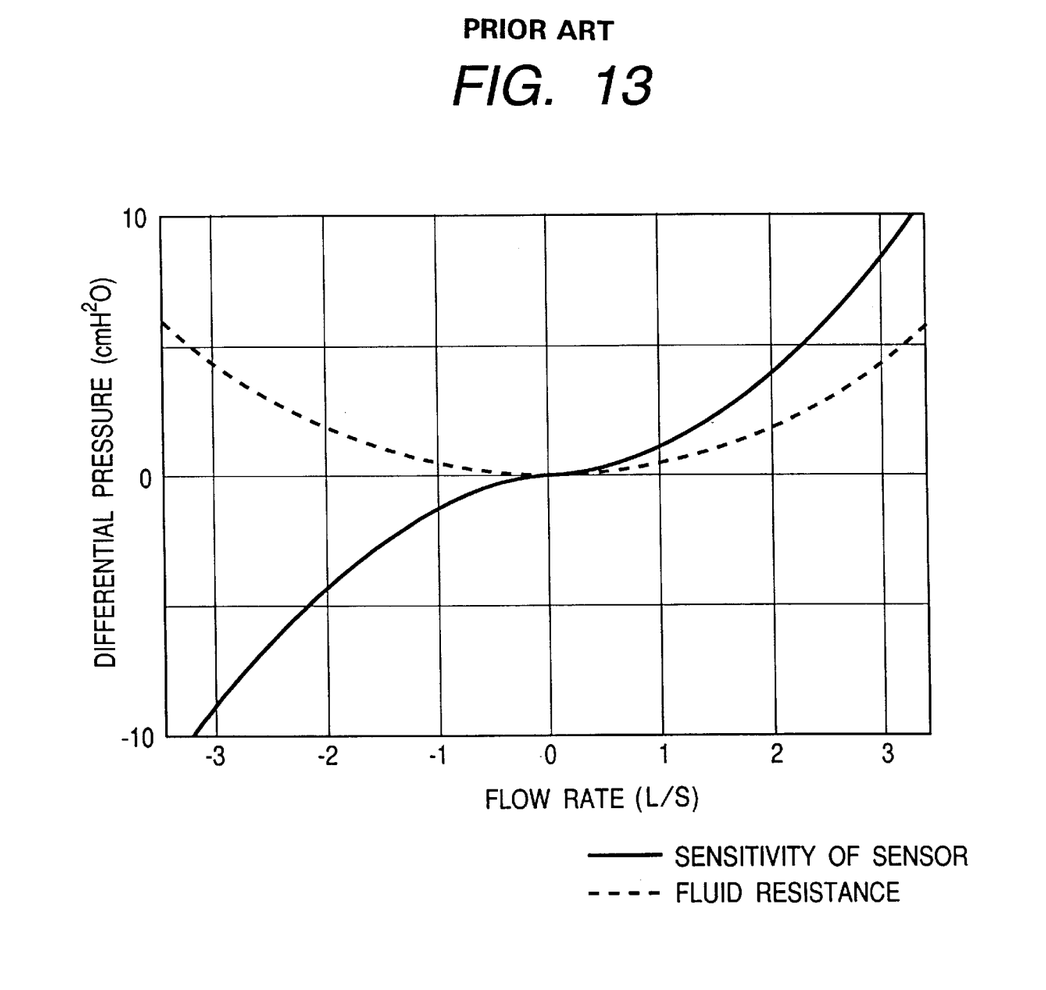
FIG. 13 a diagram showing a relation between fluid resistance and sensitivity of the flow sensor of FIG. 10 as a function of flow rate.

The construction of an exemplary conventional flow measuring apparatus of this type is shown in FIGS. 10 to 12. An apparatus shown in FIGS. 10 and 11 has been disclosed in U.S. Pat. No. 5,088,332, and is characterized as fixing a resistance within a flow path. In FIGS. 10 and 11, three vanes 2 are arranged on the inner circumference of a flow tube 1 at an angular interval of 120° toward the center. Apertures 3 are formed on both surfaces of each vane 2, the surfaces being at the center portion toward which the three vanes 2 join and being on the outer sides of the vane as viewed in the axial direction. The apertures 3 on both sides are connected to directly communicate with tubes 4 that are formed within the vane 2 so as to be orthogonal to the axial direction. The tubes 4 are connected further to a measuring instrument 5.

In the aforementioned construction, pressures of a gas at before and past the vane 2, a fixed resistance, in the flow direction are sensed through the apertures 3 and the tubes 4, and a differential pressure is detected by the measuring instrument 5, whereby the flow rate of the gas flowing through the flow tube 1 can be measured. Since the vanes 2 are arranged radially at an equal angular interval around the apertures 3, the effects of an asymmetrical flow profile are automatically eliminated. In this example, channels 6 for satisfactorily guiding a stream of gas, which collides against the surfaces of the vanes 2, into the aperture 3 are arranged in the surfaces of the vanes 2.

An apparatus shown in FIG. 12 has been disclosed in U.S. Pat. No. 4,083,245. In this apparatus, a variable resistance is provided within the flow path. It may be noted that in FIG. 12, parts and components corresponding to the portions shown in FIG. 10 are denoted by the same reference numerals and that their descriptions will be omitted as appropriate. In FIG. 12, the flow tube 1 includes an entrance/exit portion 1a and an exit/entrance portion 1b. Both portions 1a, 1b are fixed to each other through flanges 11a, 11b. Pressure ports 12a, 12b are respectively arranged on both portions 1a, 1b in such a manner that the pressure ports 12a, 12b are opened onto the tube. These pressure ports 12a, 12b are connected to the measuring instrument 5 through the tubes 4, respectively.

An orifice membrane 13 serving as a variable resistance is held between the flanges 11a, 11b. The orifice membrane 13 is made of rubber or an elastic body, and has at the center thereof a notched flap 14, one end of the flap 14 being integrally connected to the orifice membrane 13.

In the aforementioned construction, the pressures at before and past the orifice membrane 13 as viewed in the flow direction are sensed through the pressure ports 12 and the tubes 4, and a differential pressure is detected by the measuring instrument 5, whereby the flow rate of a gas flowing through the flow tube 1 can be measured. At this time, the orifice opens only slightly for a relatively small flow of gas, thereby giving a relatively high resistance. When the flow rate of the gas has increased, the flap 14 is pushed outward as shown in FIG. 12, so that the aperture of the orifice is increased, so that resistance is reduced. As a result, resistance that increases with increasing flow rate can be suppressed to stay constant.

A flow sensor disposed in the flow measuring apparatus shown in FIGS. 10 and 11 has the vanes 2 serving as a fixed resistance arranged radially so as to be symmetrical with respect to the apertures 3 at the center. Therefore, the flow direction can be controlled independently of the gas flow profiles, which in turn permits highly reliable differential pressure sensing. However, since the vanes 2 are fixed, fluid resistance, which corresponds to a gauge pressure on the entrance side of the flow sensor, increases with increasing flow rate of the gas flowing in both directions. As a result, sensitivity to a differential pressure to be detected on the entrance/exit side of the flow sensor varies in accordance with the flow rates. That is, within a normal respiratory flow range of ±3 L/sec, the differential pressure sensitivity at low flow rates is low and the differential pressure sensitivity at high flow rates is high.

Figure 14:
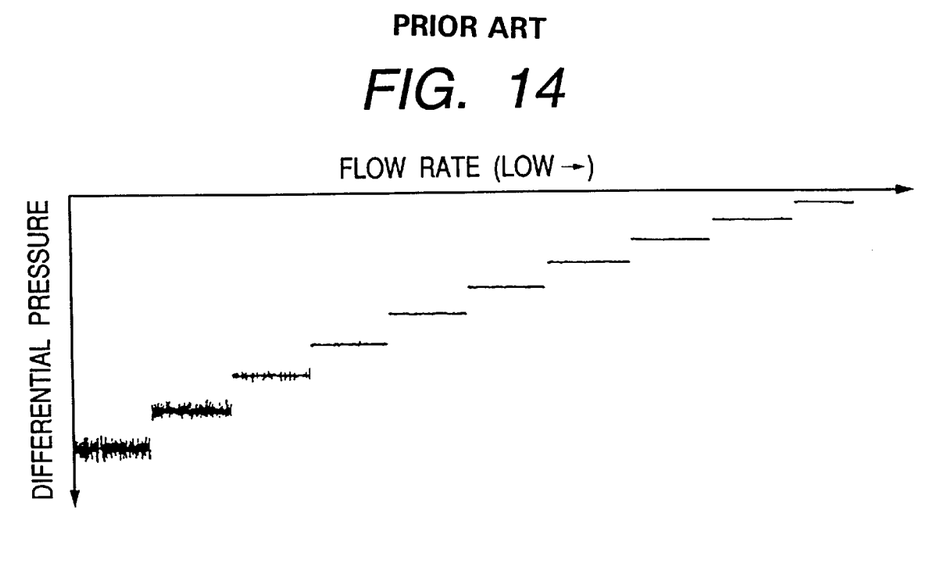
FIG. 14 a diagram illustrative of noise produced when a laminar flow is caused to flow in a direct tube connected to the flow sensor of FIG. 10.
Figure 15:
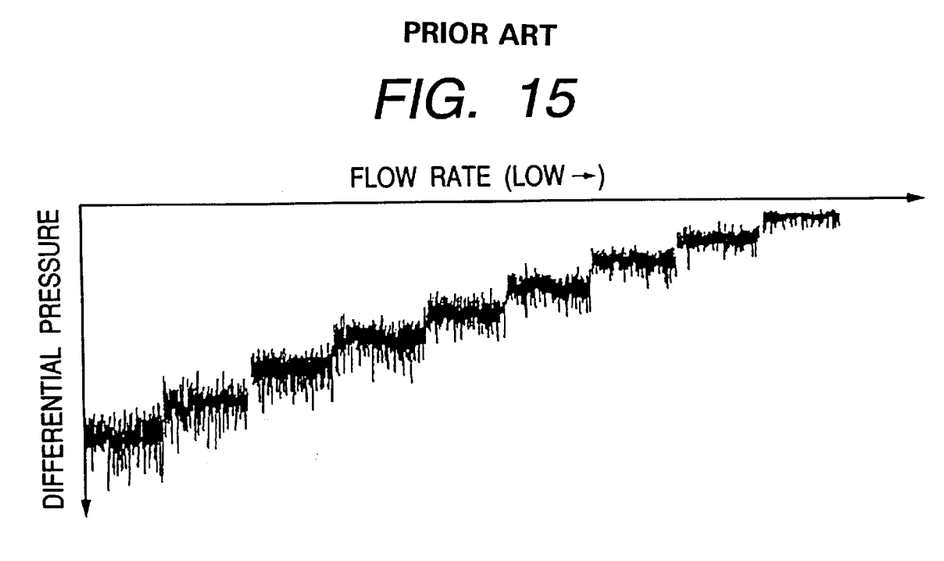
FIG. 15 a diagram illustrative of noise produced when respiratory gas is caused to flow with an endotracheal tube connected to the flow sensor of FIG. 10.

Further, since the flow tube 1 is connected to an endotracheal tube through an L connector, a Y piece, or the like, the amplitudes of pressure vibrations become large as shown in FIG. 15. As a result, noises appear in differential pressure outputs. This noise increases with increasing flow rate. To cope with this problem, correction based on electric processing must be made, which in turn makes it difficult to extract the true values of the differential pressure outputs. It may be noted that FIG. 14 shows a case where a laminar flow is caused to flow through a direct tube, exhibiting smaller noise than the case shown in FIG. 15.

Figure 16:
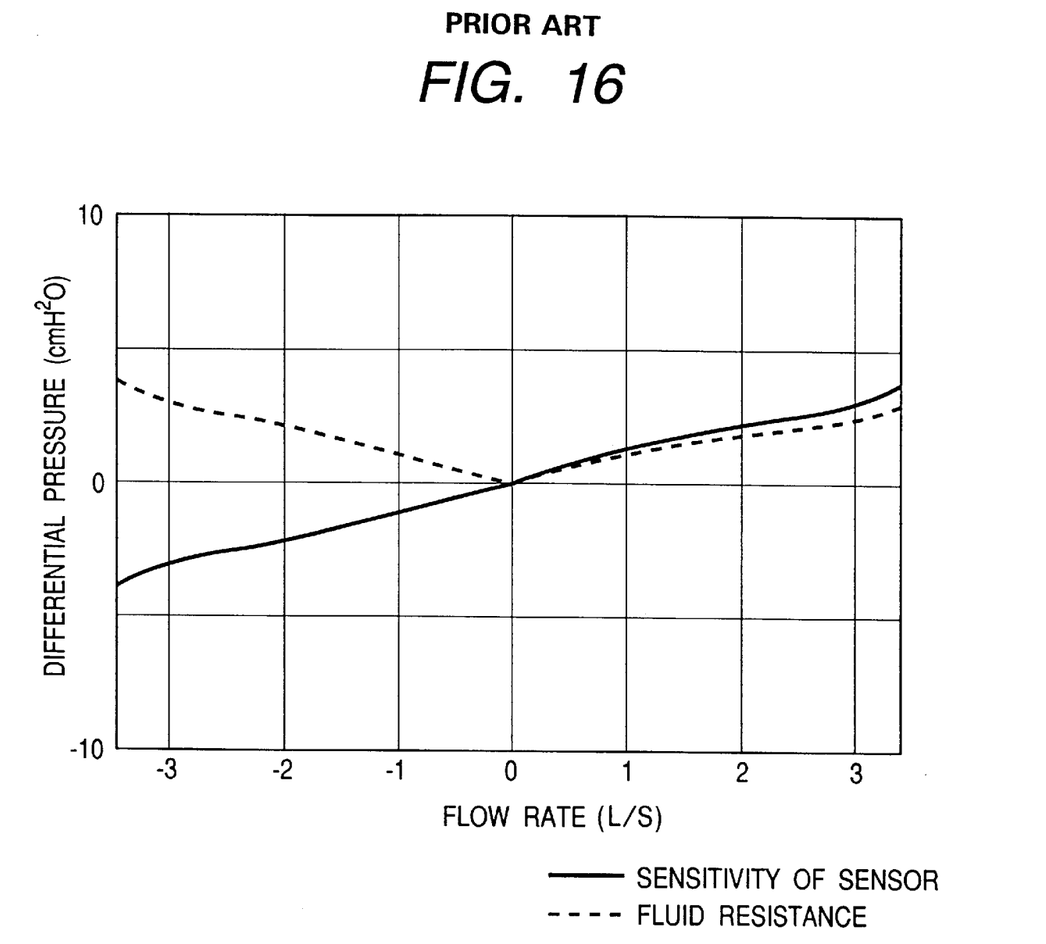
FIG. 16 a diagram showing a relation between fluid resistance and sensitivity of the flow sensor of FIG. 12 as a function of flow rate.
Figure 17:
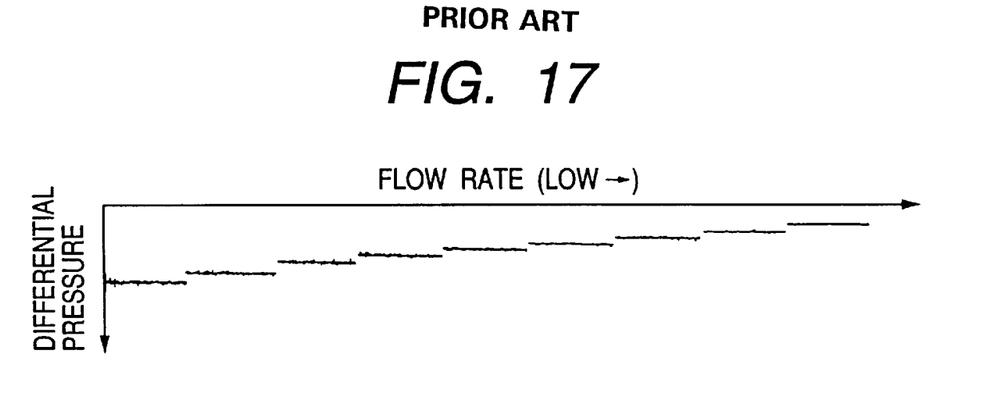
FIG. 17 a diagram illustrative of noise produced when a laminar flow is caused to flow in a direct tube connected to the flow sensor of FIG. 12.
Figure 18:
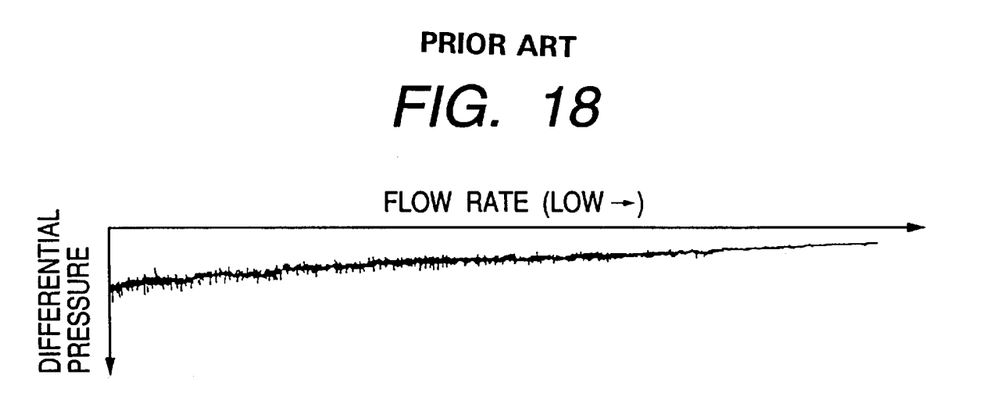
FIG. 18 a diagram illustrative of noise produced when respiratory gas is caused to flow with an endotracheal tube connected to the flow sensor of FIG. 12.

A flow sensor disposed in the flow measuring apparatus shown in FIG. 12 has the resistance being designed as a variable resistance that is constructed of the orifice membrane 13 having the flap 14. Therefore, when the flow rate of a gas increases, resistance is decreased with the flap 14 having been opened, which in turn keeps the resistance of the orifice constant. However, as shown in FIG. 16, fluid resistance is decreased and so is differential pressure sensitivity at high flow rates. In this case, as shown in FIGS. 17 and 18, the effects of the connected tubes are small and noise is decreased compared with the case of the fixed resistance shown in FIG. 10. It may be noted that FIG. 17 shows a case where a laminar flow is caused to flow through a direct tube similarly to FIG. 14, and that FIG. 18 is a case where the flow tube is connected to an endotracheal tube similarly to FIG. 15.

SUMMARY OF THE INVENTION

The present invention has been made in view of the aforementioned circumstances. The object of the present invention is, therefore, to provide a flow sensor that can establish a linear relation between flow rate and differential pressure sensitivity, that can make differential pressure measurements at low flow rates with ease, and that appearance of the noises in the differential pressure signal at high flow rates can be reduced.

The above object has been achieved by a flow sensor of the present invention provided in that:

a flow tube for allowing a gas to be circulated therethrough;

a resistance being arranged so as to go across the inside of the flow tube, wherein the resistance includes two resistance members; and pressure ports being arranged on a tubular wall of the flow tube and opened before and past the resistance, respectively.

The flow sensor detecting a differential pressure of the gas before and past the resistance. The one of the resistance members is a fixed resistance and the other is a variable resistance. The fixed resistance is a block being fixed to a circumferential wall of the flow tube and closing part of a flow path of the flow tube; and the variable resistance is an orifice having a flap, an outer circumference of the orifice being fixed to an inner circumference of the flow tube, the flap forming an aperture in the middle of the orifice while being displaced in a direction of flow of the gas.

According to the present invention, parallel plates are arranged on the block so as to confront the two pressure ports, respectively, and so as to extend in parallel to the gas flowing direction.

According to the present invention, the block, which serves as the fixed resistance disposed within the flow tube contributes to increasing differential pressure sensitivity before and past the block at low flow rates, and the orifice, which serves as a variable resistance, contributes to decreasing differential pressure sensitivity before and past the orifice at high flow rates. As a result of this construction, a linear relation between flow rate and differential pressure sensitivity can be accomplished. In addition, appearance of noises in the differential pressure signal at high flow rates can be reduced.

According to the present invention, the parallel plates disposed on the block so as to confront the pressure ports and so as to extend in parallel to the gas flowing direction. As a result of this construction, a difference between pressures before and past the block can be increased even if fluid resistance is small due to low flow rates.

According to the present invention, the parallel plates thus gives stable differential pressures over the entire range covering low flow rates and high flow rates by positively producing negative pressure at the pressure port on the downstream side as viewed in the flow direction.

DETAILED DESCRIPTION OF THE PREFERRED EMBODIMENT

A flow sensor, which is one embodiment of the present invention, will now be described with reference to the drawings.

Figure 1:
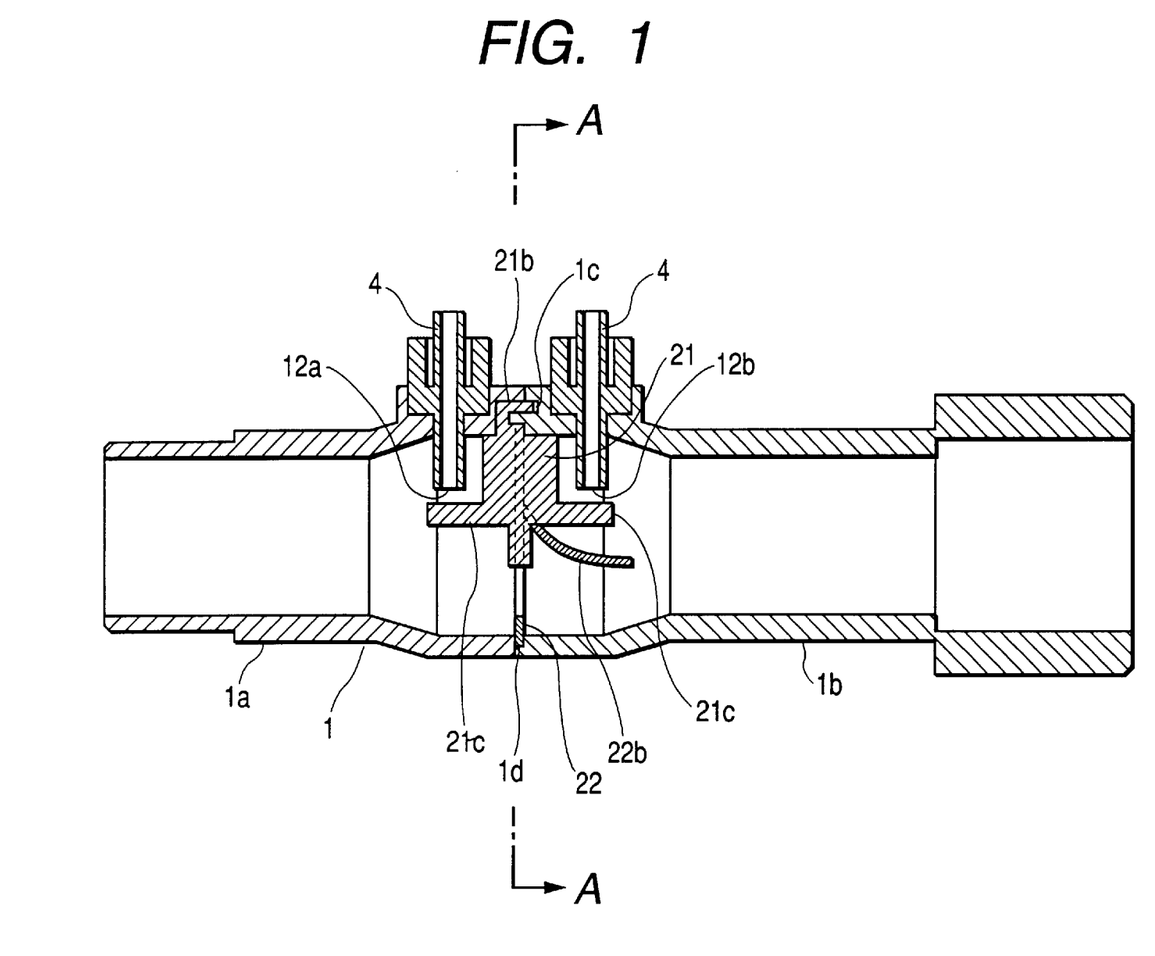
FIG. 1 is a longitudinal sectional view showing the construction of a flow sensor, which is one embodiment of the present invention.
Figure 2:
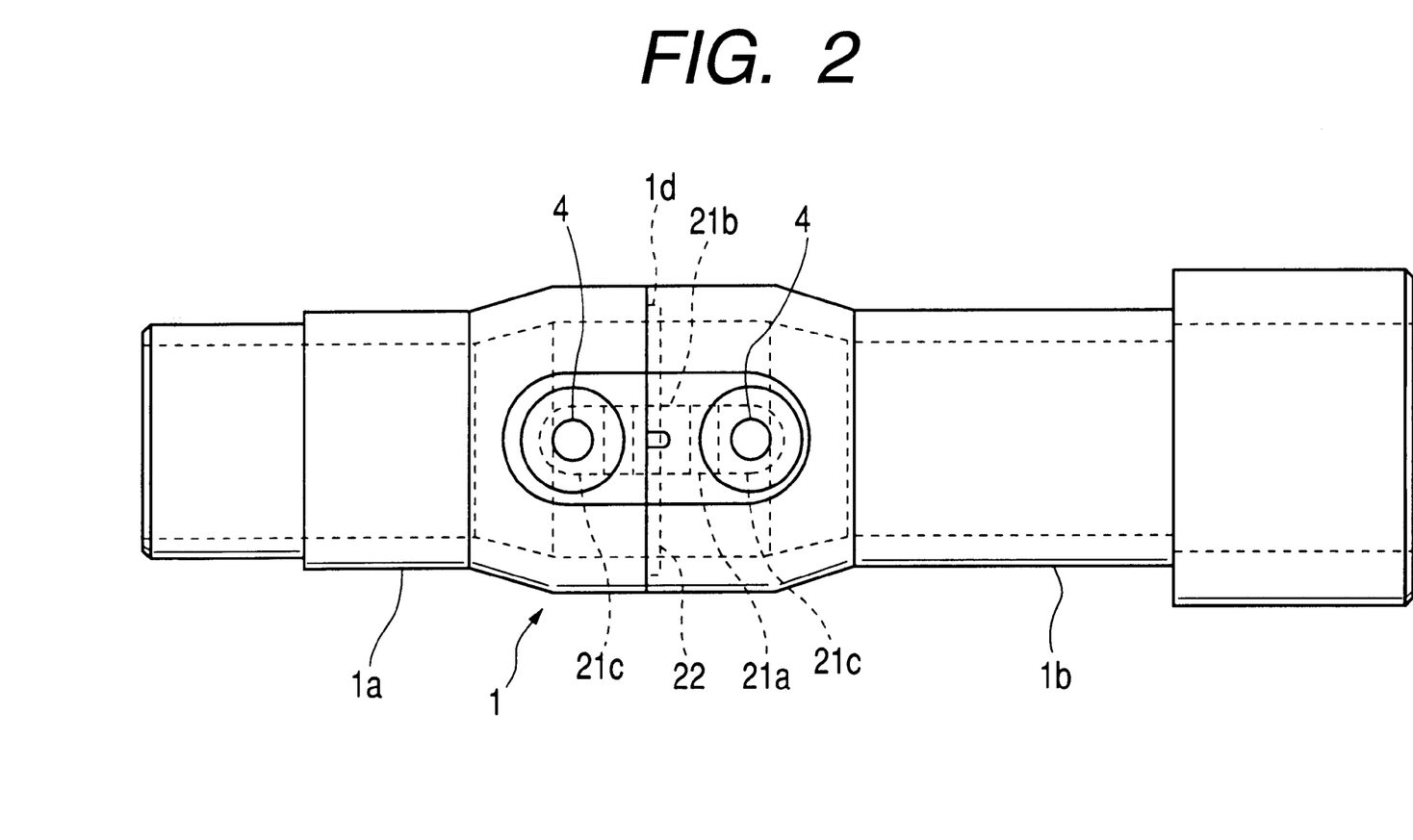
FIG. 2 a top view of FIG. 1.
Figure 3:
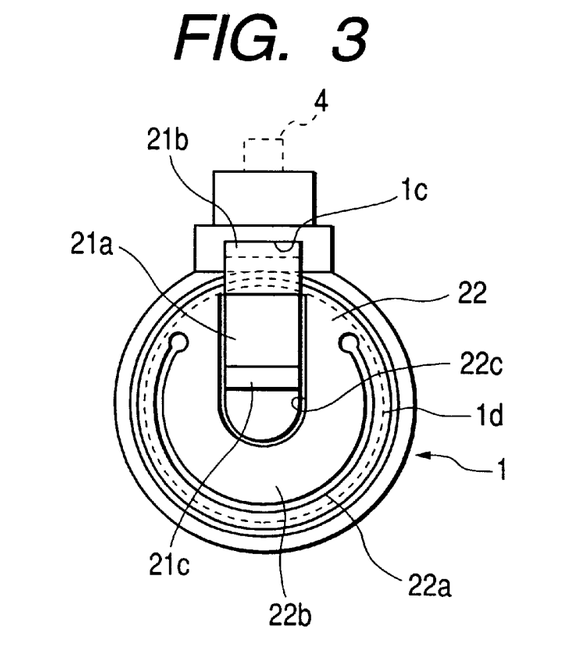
FIG. 3 a side view taken along a line A—A of FIG. 1.
Figure 4:
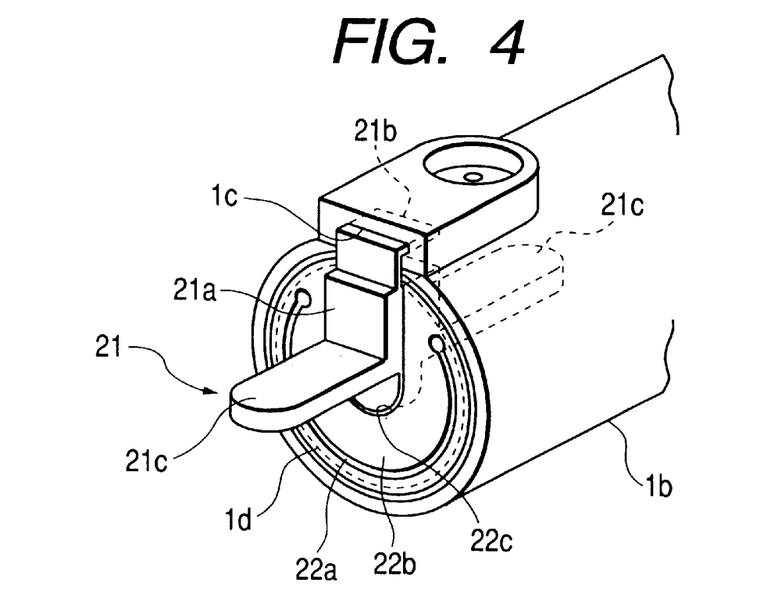
FIG. 4 a perspective view showing the connected portion of the right portion of a flow tube of FIG. 1.
Figure 5:
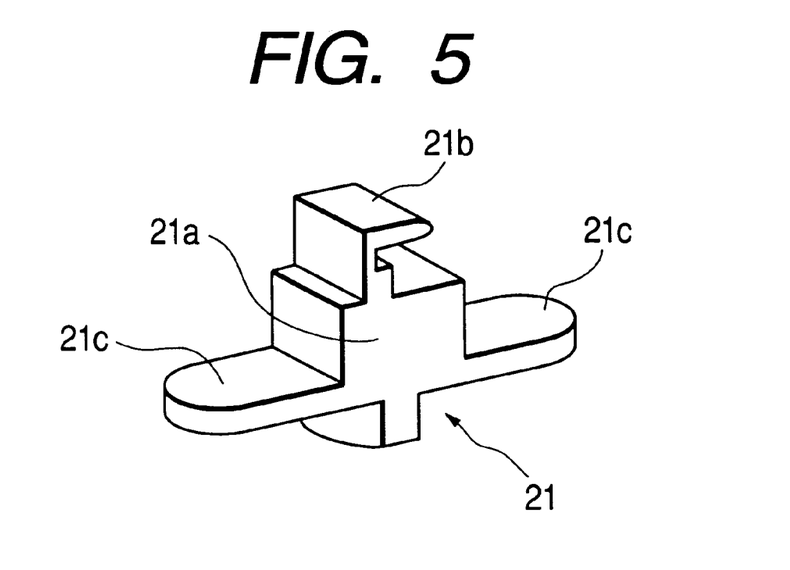
FIG. 5 a perspective view showing the shape of a block of FIG. 1.
Figure 6:
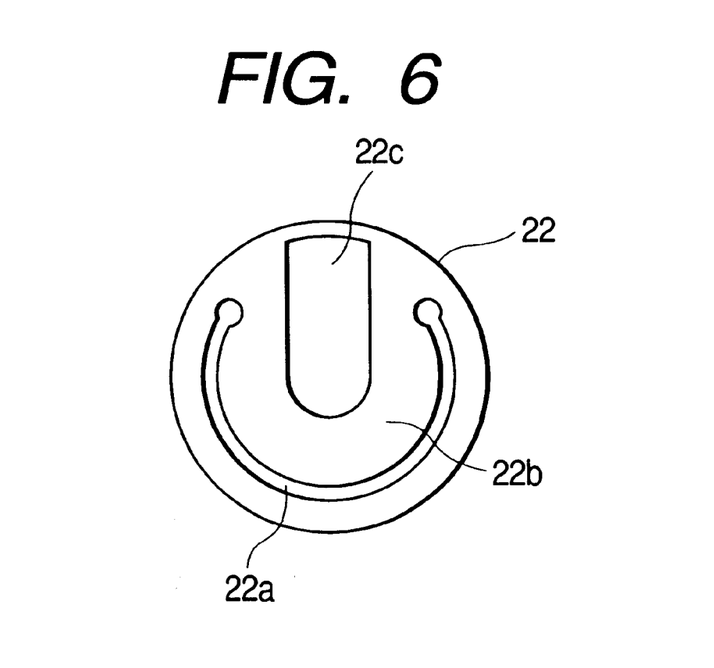
FIG. 6 a front view showing the shape of an orifice of FIG. 1.

The construction of the embodiment of the present invention is shown in FIGS. 1 to 6. FIG. 1 is a longitudinal sectional view of a flow sensor; FIG. 2 is a top view of FIG. 1; FIG. 3 is a side view taken along a line A—A of FIG. 1; FIG. 4 is a perspective view showing the connected portion of the right portion of a flow tube of FIG. 1; FIG. 5 is a perspective view showing the shape of a block of FIG. 1; and FIG. 6 is a front view showing the shape of an orifice of FIG. 1. In these drawings, parts and components corresponding to those of the conventional example shown in FIG. 12 are denoted by the same reference numerals and characters, and their descriptions will be omitted.

In FIGS. 1 to 3, a flow tube 1 includes a pair of flow tubes 1a, 1b similarly to the conventional example shown in FIG. 12. Such pair of flow tubes are integrally fixed to each other with an adhesive coaxially. A substantially cubic block 21 made of plastic serving as a fixed resistance and a disclike orifice 22 made of a flexible thin film are arranged at a portion connecting the flow tubes 1a, 1b. Tubes 4 are respectively arranged on both sides of the block 21 in a gas flowing direction so as to pass through the tubular wall of the flow tube 1 perpendicular to the direction of the axis of the flow tube 1. Ends of the tubes 4 projecting toward the flow tube 1 serve as pressure ports 12a, 12b.

As shown in FIGS. 4 and 5, the block 21 includes a cubic main body 21a, an L-shaped hook portion 21b formed on top of the main body 21a, and parallel plates 21c that project toward both sides from a portion close to the lower end of the main body 21a so as to extend in parallel with the gas flowing direction. These components 21a, 21b, 21c are formed integrally. The hook portion 21b engages with a mounting hole 1c formed in an outer circumference close to the end face of one flow tube 1b, so that the hook portion 21b is held so as to allow both surfaces of the main body 21a to extend perpendicular to the gas flowing direction. The pressure ports 12a, 12b are positioned within areas defined by the parallel plates 21c, respectively, as shown in FIGS. 1 and 2.

As shown in FIG. 6, the orifice 22 is formed of a disclike flexible plastic thin film, and has an arcuate notch 22a formed close to the outer circumference thereof so as to be concentric with each other. A portion inside the notch 22a forms a flap 22b. The flap 22b is connected integrally with the orifice 22 at an unnotched portion. Further, a hole portion 22c into which the block 21 is fitted is formed further inside of the flap 22b. The outer circumference of the orifice 22 engages with a stepped portion 1d formed on the inner circumferential side of the flow tube 1b so as to be held in place. A condition in which the block 21 and the orifice 22 are attached to the end face of the flow tube 1b is shown in FIG. 4.

In the thus constructed flow sensor according to this embodiment, in the case of the flow rate of a gas such as respiratory flow passing through the flow tube 1 is low, fluid resistance produced by the block 21 serving as a fixed resistance is small. However, the flap 22b of the orifice 22 is displaced only slightly, so that the flap 22b gives relatively high resistance with the aperture of the orifice reduced. As a result, differential pressure sensitivity is increased. Conversely, in the case of the flow rate of a gas is high, the flap 22b is pushed outward, which in turn increases the aperture to thereby reduce fluid resistance as a whole. As a result, resistance that increases with increasing flow rate can be controlled so as not to make a significant change. Hence, the relation between flow rate and differential pressure sensitivity can be made linear.

On the other hand, since the orifice 22 serving as a variable resistance is provided, the noises in differential pressure signal are reduced due to a tube connected to an endotracheal tube or the like when the flow rate is high can be reduced similarly to the conventional example shown in FIGS. 17 and 18. Further, by arranging the parallel plates 21c on the block 21, differential pressure can be increased, e.g., even in the case where fluid resistance is as low as 3 cmH$_2$O or less at a flow rate of 1.5 L/sec.

Still further, by arranging the parallel plates 21c on the block 21, negative pressure is positively produced on the pressure port on the downstream side as viewed in the flowing direction. For example, even in the case where fluid resistance is as low as 3 cmH$_2$O at a flow rate of 1.5 L/sec, differential pressure can be increased.

Figure 7:
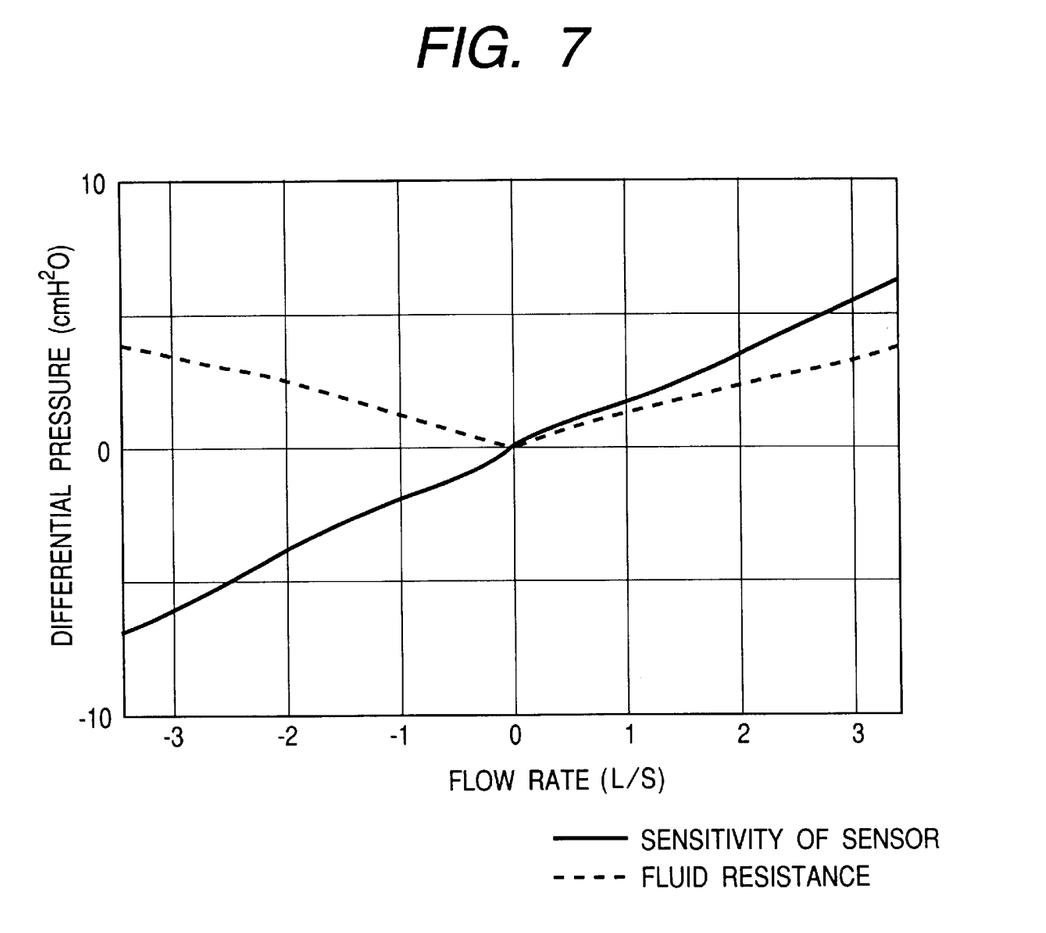
FIG. 7 a diagram showing a relation between fluid resistance and sensitivity of the flow sensor of FIG. 1 as a function of flow rate.
Figure 8:
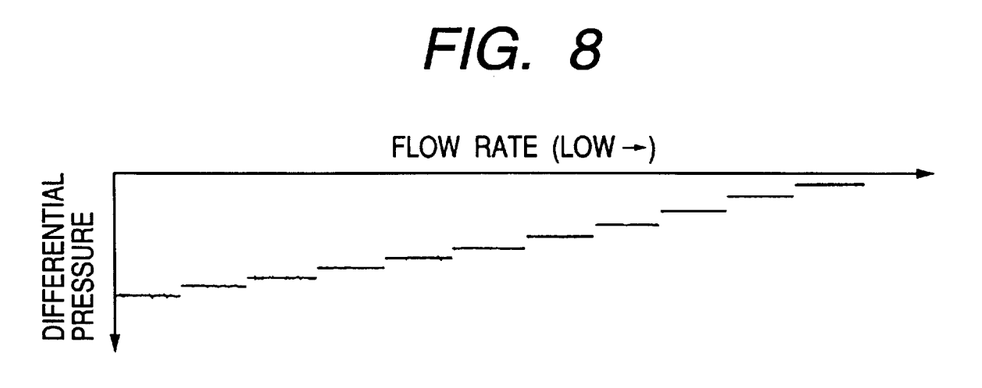
FIG. 8 a diagram illustrative of noise produced when a laminar flow is caused to flow through a direct tube connected to the flow sensor of FIG. 1.
Figure 9:
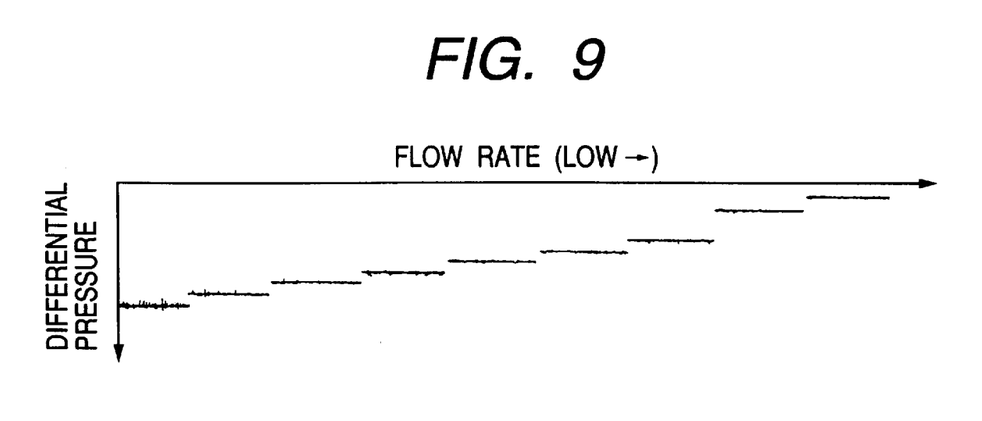
FIG. 9 a diagram illustrative of noise produced when respiratory flow is caused to flow with an endotracheal tube connected to the flow sensor of FIG. 1.

FIGS. 7 to 9 show experimental results using the flow sensor according to this mode of embodiment. FIG. 7 shows characteristics between fluid resistance and differential pressure sensitivity as a function of respiratory flows in both directions. As is apparent from FIG. 7, there are small variations in fluid resistance, and differential pressure sensitivity is also substantially linear within a normal respiratory flow range of ±3 L/sec. FIG. 8 shows a condition of noise that is produced by the influence of connected tubes when a laminar flow is caused to flow to the flow sensor through a direct tube. FIG. 9 shows a condition of noise produced when the flow sensor is connected to an endotracheal tube through an L-shaped connector, a Y piece, or the like. As is apparent from FIGS. 8 and 9, production of noise in the high flow rate range is particularly reduced compared with such cases where there is only a fixed resistance as shown in FIGS. 14 and 15.

It may be noted that in the aforementioned experiments, the ratio of the area of a fixed resistance to the area of a variable resistance is set to 1: 1.7 when a flow rate of 3 L/sec is measured at a differential pressure of ±10 cmH$_2$O.

According to this mode of embodiment, the block 21 serving as a fixed resistance and the orifice 22 serving as a variable resistance are arranged jointly within the flow tube 1, and the parallel plates 21c are arranged in the block 21 so as to extend in parallel with the gas flowing direction. Therefore, fluid resistance changes substantially linearly with increasing or decreasing flow rate, and differential pressure sensitivity becomes linear, which in turn allows differential pressure to be reliably detected both at high flow rates and at low flow rates. As a result, electrical processing at the time of measuring the flow rate based on differential pressure can be made easier. In addition, the appearance of the noises in the differential pressure signal by the influence of connected tubes under high flow rates can also be reduced.

While the case where the block 21 is used as a fixed resistance and the orifice 22 having the flap 22b is used as a variable resistance has been described in the aforementioned mode of embodiment, the fixed resistance and the variable resistance are not limited to the block 21 and the orifice 22, respectively, but may be of other construction as well.

What is claimed is:

1. A flow sensor comprising:
   a flow tube for allowing a gas to be circulated therethrough;
   a first resistance member arranged across a diameter inside of said flow tube;
   a second resistance member arranged on only one portion, in a circumferential direction, of an inner wall of said flow tube and partially extending into a flow path of said gas with said first resistance member; and
   pressure ports arranged on a wall of said flow tube and opened before and past said first and second resistance members respectively, wherein said flow sensor detects a differential pressure of said gas before and past said first and second resistance members;
   wherein said first resistance member is a variable resistance and said second resistances member is a fixed resistance; and
   wherein said fixed resistance member is a block secured to a circumferential wall of said flow tube, said fixed resistance member closing art of said flow path of said flow tube.

2. A flow sensor according to claim 1, wherein an outer circumference of said variable resistance member is secured to an inner circumference of said flow tube, and has a flap forming an aperture in said variable resistance member while being displaced in a direction of flow of said gas.

3. A flow sensor according to claim 2, wherein said variable resistance member is an orifice membrane.

4. A flow sensor according to claim 1, said block further comprising parallel plates which confront said pressure ports, respectively.

5. A flow sensor according to claim 4, wherein said parallel plates are arranged to extend in parallel to said flow direction of said gas.

6. A flow sensor according to claim 5, wherein said pressure ports are positioned within areas defined by said parallel plates, respectively.

* * * * *